United States Patent
Gokhale et al.

(10) Patent No.: US 11,112,252 B2
(45) Date of Patent: Sep. 7, 2021

(54) SENSOR FUSION FOR ACCURATE LOCALIZATION

(71) Applicant: Hitachi, Ltd., Tokyo (JP)

(72) Inventors: Akshay Gokhale, Farmington, MI (US); Atsushi Yokoyama, West Bloomfield, MI (US)

(73) Assignee: HITACHI LTD., Tokyo (JP)

( * ) Notice: Subject to any disclaimer, the term of this patent is extended or adjusted under 35 U.S.C. 154(b) by 282 days.

(21) Appl. No.: 16/276,483

(22) Filed: Feb. 14, 2019

(65) Prior Publication Data

US 2020/0263996 A1 Aug. 20, 2020

(51) Int. Cl.
| | |
|---|---|
| G01C 21/32 | (2006.01) |
| G01S 13/86 | (2006.01) |
| G06F 16/29 | (2019.01) |
| G09B 29/10 | (2006.01) |
| G01S 19/45 | (2010.01) |
| G01S 17/86 | (2020.01) |

(52) U.S. Cl.
CPC ............. *G01C 21/32* (2013.01); *G01S 13/86* (2013.01); *G01S 17/86* (2020.01); *G01S 19/45* (2013.01); *G06F 16/29* (2019.01); *G09B 29/106* (2013.01)

(58) Field of Classification Search
CPC ......... G01C 21/32; G01S 13/86; G01S 19/45; G01S 17/023; G06F 16/29
See application file for complete search history.

(56) References Cited

U.S. PATENT DOCUMENTS

| | | | |
|---|---|---|---|
| 9,562,778 B2 | 2/2017 | DuHadway et al. | |
| 2008/0033645 A1 | 2/2008 | Levinson et al. | |
| 2014/0379254 A1* | 12/2014 | Miksa | G01C 21/3811 701/450 |
| 2017/0023659 A1* | 1/2017 | Bruemmer | G01S 5/0263 |
| 2017/0076455 A1* | 3/2017 | Newman | G06T 7/74 |
| 2018/0188037 A1* | 7/2018 | Wheeler | H04L 67/12 |
| 2018/0314921 A1* | 11/2018 | Mercep | G06K 9/6282 |
| 2020/0209882 A1* | 7/2020 | Kashi | G10K 11/178 |

* cited by examiner

*Primary Examiner* — Tan Q Nguyen
(74) *Attorney, Agent, or Firm* — Procopio, Cory, Hargreaves & Savitch LLP

(57) ABSTRACT

To localize a vehicle in the given map precisely for autonomous driving, the vehicle needs to compare the sensor perceived environment with the map information accurately. To achieve this, the vehicle may use information received from multiple on-board sensors in combination of GPS and map data. Example implementations described herein are directed to maintaining accuracy of sensor measurements for autonomous vehicles even during sensor failure through a raw data fusion technique and a repopulation of data through a prediction technique based on historical information and statistical method if any of the sensors fail.

18 Claims, 14 Drawing Sheets

| Weight | | Real-time Point Cloud | | |
|---|---|---|---|---|
| | | C | CL | L |
| Point Cloud Map | C | 3 | 4 | 2 |
| | CL | 4 | 6 | 4 |
| | L | 2 | 4 | 3 |

FIG. 11(a)

| Weight | | Real-time Point Cloud | | |
|---|---|---|---|---|
| | | C/C' | CL | L/L' |
| Point Cloud Map | C | 3 | 4 | 2 |
| | CL | 4 | 6 | 4 |
| | L | 2 | 4 | 3 |

FIG. 11(b)

SENSOR FUSION FOR ACCURATE LOCALIZATION

BACKGROUND

Field

The present disclosure is generally directed to autonomous vehicles, and more specifically, to ground vehicle localization using multiple sensors for autonomous driving.

Related Art

Localization is a process of identifying the location of a ground vehicle in given map for the point to point navigation and control. Localization is one of the key aspects in driving a vehicle autonomously from point A to point B. Further, such technology is used in several other applications. In an operator or driver driven vehicle, localization is used to provide turn by turn directions to the operator or driver. Accuracy requirements in driver/operator driven vehicles for localization are not as high as that of autonomous vehicles as the driver or operator can compensate for errors through additional information of their perception of the environment. Hence, for example, Global Positioning System (GPS) based localization is sufficient enough for a driver/operator to drive the vehicle from point A to B.

However, in the case of autonomous vehicles, the localization accuracy required can be as small as 3-10 centimeters. As GPS sensors normally have accuracy between 1-3 meters and sometime as broad as 10 to 50 meters, it cannot be solely relied upon for autonomous driving applications.

Thus, there is a need for on-board sensors to perceive the environment and detect surrounding data to achieve the positional accuracy of 3-10 cm along with GPS and map data. Related art implementations utilize multiple on-board sensors such as lasers, cameras or radars in combination with GPS and map data for estimating vehicle localization for autonomous driving. Such related art implementations of combining multiple sensor data is known as sensor fusion. Although much progress has been made in this field, one key aspect which has not been yet addressed by the related art involves how to proceed when one of the sensors fails. Related art implementations address such failures by ignoring the bad sensor data or the sensor if the sensor fails and proceed with a decrease of accuracy. The accuracy has been found to decrease to 50-60 cm when sensor failure occurs.

As localization is an estimation based technique on previous predictions and sensor data corrections, the errors in the system can add up if one of the sensors fail. Large inaccuracies of >70 cm to 1 m is safety critical and renders autonomous vehicles to be accident prone. For example, suppose the vehicle nominal width is 1.9 m and lane width is 2.5 m. If localization accuracy drops to 1 m, the autonomous vehicle may cross over other lane though estimating itself in the center of its ego lane. Thus, there is clear need to address the issue of improving localization estimation and maintaining sufficient accuracy even during an occurrence of sensor failure.

In a related art implementation, there is a method of using radar and GPS sensor for the localization of a vehicle. The radar sensor is used on objects in the surroundings and the abstract information is used. The vehicle location probability is determined by GPS sensor and then estimated using radar and a symbolic map. However, such related art implementations have inherent disadvantages such that the radar sensor has low spatial resolution and there is no implementation to handle when the radar stops working or GPS data is not available (e.g., due to vehicle passing under tunnel or bridge or in a densely populated urban canyon).

In a related art implementation, a high-resolution map of the terrain with well-defined structures and unstructured section is created using GPS, cameras and lasers sensors. Such related art implementations involve methods to localize the vehicle using this high-resolution map and by attempting to maximize the likelihood of the observed sensor data. However, in such related art implementations, if the data for a time period is not received (e.g., such as during sensor failure) such implementations cannot update the vehicle location for that time period or subsequent time periods until it receives the data from the sensor. Thus, such related art implementations may not localize the vehicle at all if the sensor has a critical mechanical or electrical failure. Additionally, in such cases in which the sensor does not work for certain time periods due to weather or environmental conditions, the error in estimation can increase and may even be more than 1-2 m which would incur safety risks.

SUMMARY

Example implementations described herein are directed to systems and methods for achieving high level accuracy in case of an on-board sensor failure.

To localize a vehicle in the given map precisely, the vehicle need to compare the sensor perceived environment with the map information accurately. To achieve the localization, the vehicle may use information received from multiple on-board sensors in combination of GPS and map data. Sensors such as lasers, cameras, radars, sonars are commonly used by vehicles to perceive environment. This environmental perception information is then compared with High Definition (HD) map information to identify the map area where the vehicle is located.

Sensor fusion is necessary as none of the sensors available can provide all information in all-weather or environmental conditions. Sensor fusion can be applied to an abstract level of information. For example, if the camera and laser detect a building in the scene, then the information can be fused to generate high level of confidence. Alternatively, sensor fusion can also be applied to raw data from the sensors. For example, pixel information from the camera and the point cloud of the laser corresponding to the same building in the scene can be fused to generate the point cloud of the building with a high level of confidence. However, if any of the sensors fail, then the confidence level in both sensor fusion methodologies is decreased.

Example implementations involve a raw data fusion technique. In addition to the sensor fusion, example implementations are directed to the repopulation of data through a prediction technique based on historical information and statistical methods if any of the sensors fail. Once the information is repopulated, the information is then used to match to the HD map. If more than a specified threshold of the information is matched with high accuracy, the information is then used to localize the vehicle, thereby achieving the desired level of confidence. Such example implementations utilize raw sensor fusion, as prediction of a complete structural entity with its orientation can be difficult due to multiple variations and can be computationally expensive.

Example implementations described herein can also address the issues of sensor failure due to weather conditions. For example, in extreme bright light conditions against the camera, the camera may not be able to provide any data, however, example implementations utilize the prediction method based on historical information to compensate in addition to other sensor data to make accurate localization estimations.

Aspects of the present disclosure can involve a method for an autonomous vehicle having a plurality of sensors, the method involving for a failure occurring in at least one of the plurality of sensors, obtaining first sensor data points from working ones of the plurality of sensors; obtaining second sensor data points from a historical database; conducting a prediction of missing sensor data points based on an error correction process applied in comparing the first sensor data points and the second sensor data points; weighing the missing sensor data points and the first sensor data points; and applying the weighted missing sensor points and the first sensor data points to localization for autonomous vehicle functions of the autonomous vehicle.

Aspects of the present disclosure further involve a non-transitory computer readable medium, storing instructions for an autonomous vehicle having a plurality of sensors, the instructions involving for a failure occurring in at least one of the plurality of sensors, obtaining first sensor data points from working ones of the plurality of sensors; obtaining second sensor data points from a historical database; conducting a prediction of missing sensor data points based on an error correction process applied in comparing the first sensor data points and the second sensor data points; weighing the missing sensor data points and the first sensor data points; and applying the weighted missing sensor points and the first sensor data points to localization for autonomous vehicle functions of the autonomous vehicle.

Aspects of the present disclosure further involve a system an autonomous vehicle having a plurality of sensors, the system involving for a failure occurring in at least one of the plurality of sensors, means for obtaining first sensor data points from working ones of the plurality of sensors; means for obtaining second sensor data points from a historical database; means for conducting a prediction of missing sensor data points based on an error correction process applied in comparing the first sensor data points and the second sensor data points; means for weighing the missing sensor data points and the first sensor data points; and means for applying the weighted missing sensor points and the first sensor data points to localization for autonomous vehicle functions of the autonomous vehicle.

Aspects of the present disclosure further involve an apparatus configured to manage an autonomous vehicle having a plurality of sensors, the apparatus involving a processor, configured to, for a failure occurring in at least one of the plurality of sensors, obtain first sensor data points from working ones of the plurality of sensors; obtain second sensor data points from a historical database; conduct a prediction of missing sensor data points based on an error correction process applied in comparing the first sensor data points and the second sensor data points; weigh the missing sensor data points and the first sensor data points; and apply the weighted missing sensor points and the first sensor data points to localization for autonomous vehicle functions of the autonomous vehicle.

BRIEF DESCRIPTION OF DRAWINGS

FIG. 11(a) illustrates an example of weights set to elements, in accordance with an example implementation.

FIG. 11(b) illustrates an example of weights set to elements when a sensor has failed, in accordance with an example implementation.

DETAILED DESCRIPTION

Figure 1A:
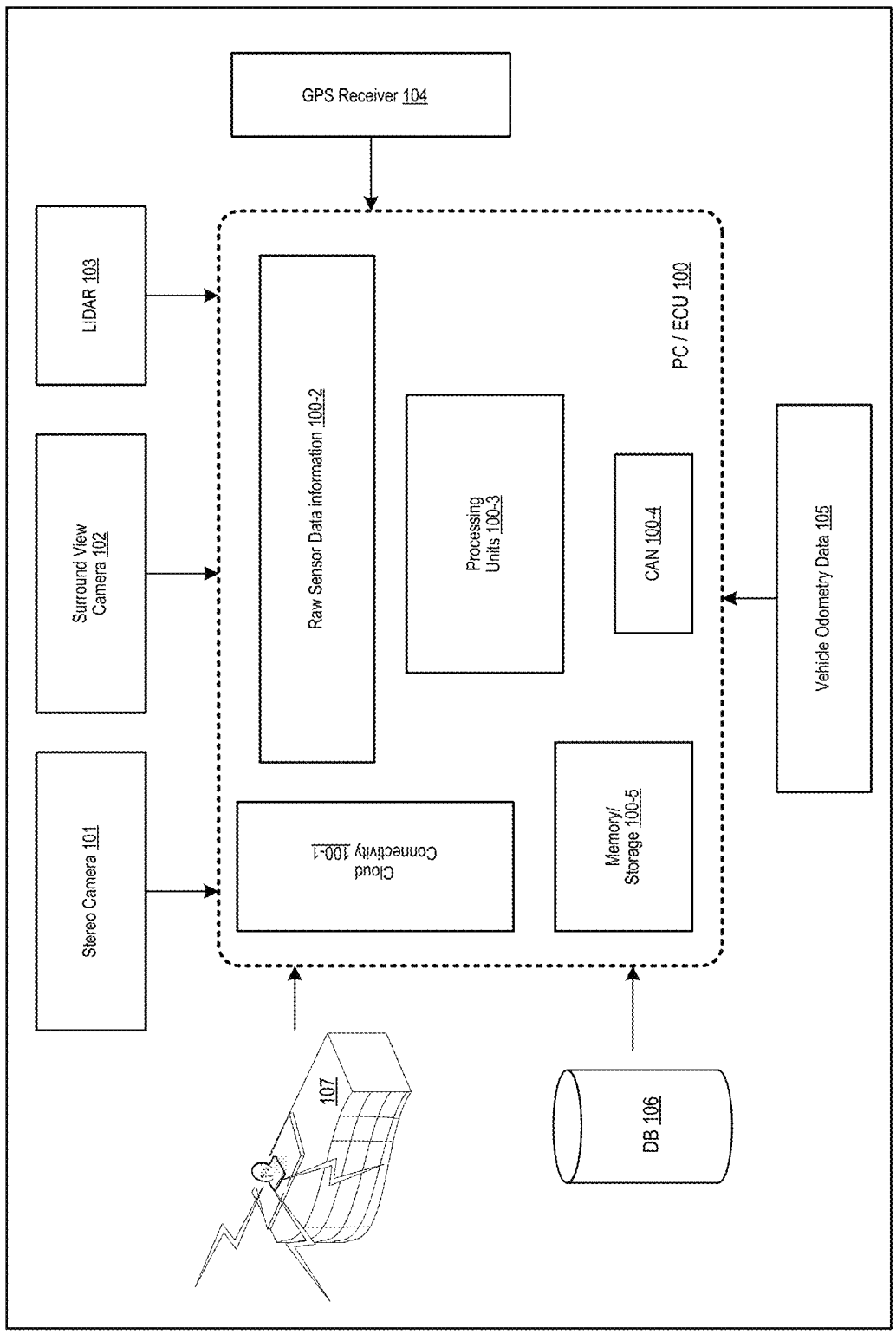
FIG. 1(a) illustrates an example system architecture in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

To localize a vehicle in the given map precisely, the vehicle need to compare the sensor perceived environment with the map information accurately. To achieve this, the vehicle may use information received from multiple onboard sensors in combination of GPS and map data. Sensors such as lasers, cameras, radars, sonars are commonly used by vehicles to perceive environment. This environmental perception information is then compared with High Definition (HD) map information to identify the area of map where the vehicle is located. In example implementations, a raw data fusion technique is utilized. In addition to the sensor fusion, example implementations described herein involve a method of repopulation of data through a prediction technique based on historical information and statistical method if any of the sensors fail. Once the information is repopulated, it is then used to match the HD map. If more than a certain threshold of the information is matched with high accuracy, the information is used to localize the vehicle thus achieving the high level of confidence.

Through the example implementations described herein, the sensor accuracy required to maintain autonomous driving can be facilitated even in cases of sensor failure.

Autonomous driving requires precise location estimation within a few centimeters of accuracy to drive safely and comfortably on the public roads and highways. To achieve this, example implementations utilize the on-board sensors of vehicle to capture the environmental information in the form of a raw point cloud from laser sensor, the raw data such as images from a camera, the disparity maps from stereo camera, and so on. The on-board sensors may include but not restricted to GPS receivers, plurality of cameras or laser sensors etc. The information captured by these sensors is received by on-board computer or electronic control unit (ECU). The on-board computer or ECU can be a personal computer (PC) or embedded system including a communication interface, to communicate with the sensors and actuators of the vehicle; storage space such as Random Access Memory (RAM)/Read Only Memory (ROM) or hard disk with enough memory to store required amount of data; processor unit capable of running algorithms required by autonomous vehicles; and an interface to communicate to the cloud or servers. The computer/ECU use data to estimate the vehicle location by comparing environment data acquired from the sensor with the HD map either stored in its memory or obtained from a specified server for the location.

FIG. 1(a) illustrates an example system architecture in accordance with an example implementation. Specifically, FIG. 1(a) illustrates an example sensor architecture for an autonomous vehicle. The system can involve a PC/ECU 100, stereo camera 101, surround view camera 102, LIDAR 103, GPS receiver 104, vehicle odometer data 105, database (DB) 106, and network interface (I/F) 107. PC/ECU 100 can include cloud connectivity 100-1, raw sensor data information 100-2, processing units 100-3, car area network (CAN) 100-4, and memory/storage 100-5. Processing units 100-3 can be in the form of hardware processors such as central processing units (CPU), or a combination of hardware and software processors in accordance with a desired implementation.

Figure 2:
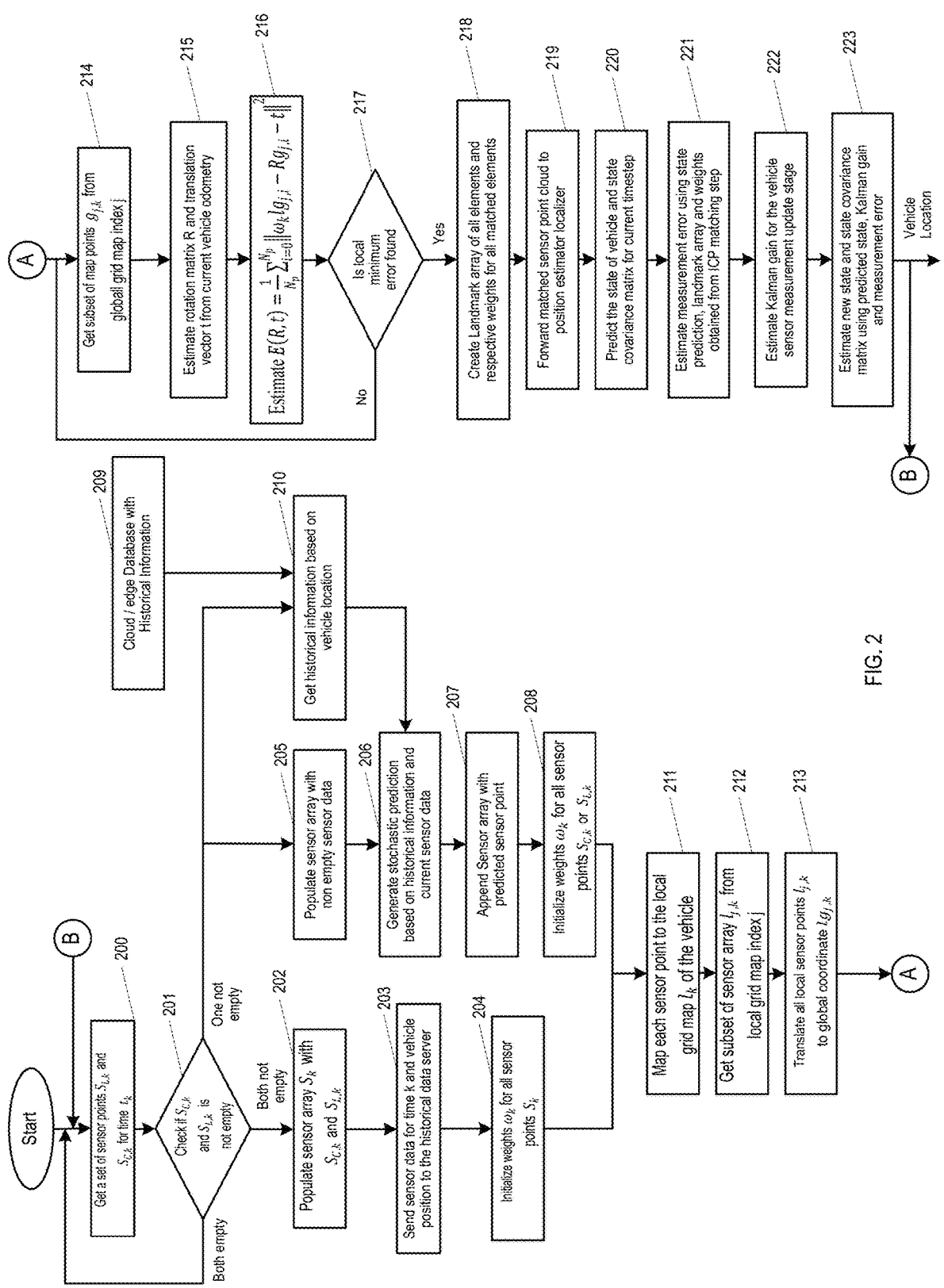
FIG. 2 illustrates an example flow in accordance with an example implementation.

In example implementations, processing units 100-3 can be configured to, for a failure occurring in at least one of the plurality of sensors 101, 102, 103, obtain first sensor data points from working ones of the plurality of sensors; obtain second sensor data points from a historical database; conduct a prediction of missing sensor data points based on an error correction process applied in comparing the first sensor data points and the second sensor data points; weigh the missing sensor data points and the first sensor data points; and apply the weighted missing sensor points and the first sensor data points to localization for autonomous vehicle functions of the autonomous vehicle as shown in the flow of FIG. 2 from 200-201, and 205-223.

In example implementations, processing units 100-3 can be configured to, for a non-failure of the plurality of sensors, transmit sensor data points of the plurality of sensors for an associated timestamp to the historical database 106 through network interface 107; weigh the sensor data points; and apply the weighted sensor points to the localization for the autonomous vehicle functions of the autonomous vehicle as shown in the flow of FIG. 2 from 200-204, 211-223.

Depending on the desired implementation, historical database 106 can be managed in an apparatus external to the autonomous vehicle, and the historical database can contain historical data of camera sensor data points and LIDAR sensor data points for a plurality of locations recorded from sensor data of a plurality of autonomous vehicles.

In example implementations, processing units 100-3 can be configured to conduct the prediction of the missing sensor data points by translating the received second sensor data points from the historical database according to local coordinates with respect to an orientation and location of the autonomous vehicle; generating predictions of the missing data sensor points based on landmark objects associated with the translated second sensor data points within an error covariance; and providing the predictions of the missing sensor data points having a lowest error covariance as the missing sensor data points as illustrated in FIG. 2 from 206-208.

Depending on the desired implementation, the weighing of the missing sensor data points and the first sensor data points can be based on a map matching process as illustrated in FIG. 2 in the flow from 211-223. Such a map matching process can involve matching the missing sensor data points and the first data sensor points to associated points corresponding to landmarks in the historical database; for matched points corresponding to camera and LIDAR ones of the points corresponding to the landmarks in the historical database, assign a first weight; for matched points corresponding to only camera ones of the points corresponding to the landmarks in the historical database, assign a second weight that is less than the first weight; for matched points corresponding to only LIDAR ones of the points corresponding to the landmarks in the historical database, assign a third weight that is less than the second weight as illustrated in FIG. 2 from the flow of 211-223.

Figure 1B:
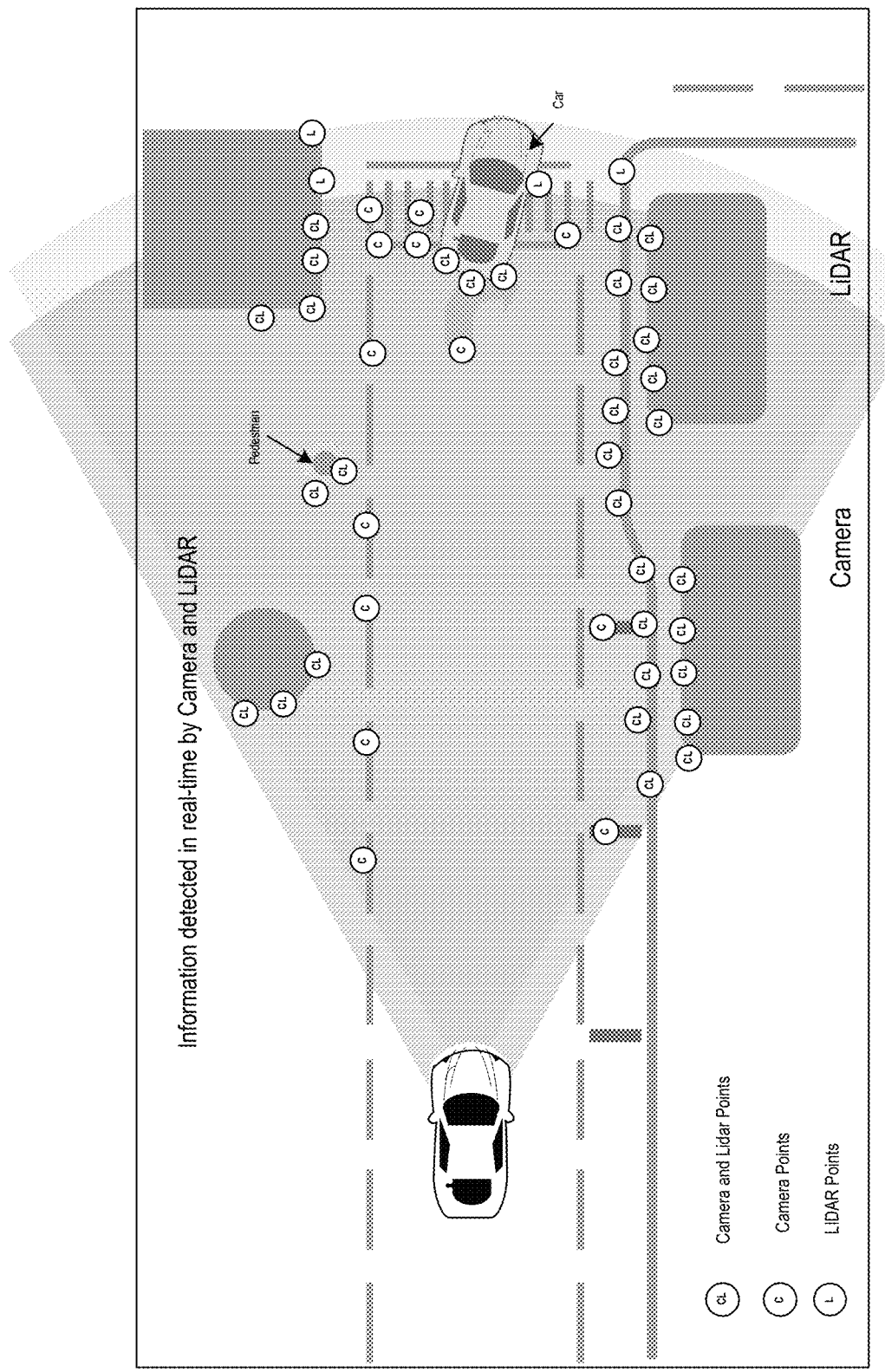
FIG. 1(b) illustrates an example of an overlap region, in accordance with an example implementation.

FIG. 1(b) illustrates an example of an overlap region, in accordance with an example implementation. As illustrated in FIG. 1(a), the system has at least one forward looking camera and one forward looking laser that form an overlap region as shown in FIG. 1(b).

The system as illustrated in FIG. 1(a) is an example for explanation purpose and the present disclosure is not limited thereto. Various combinations of sensors, or various numbers of similar sensors can still be used in accordance with the desired implementation. Further, the location and the types of sensors is not limited to the shown diagram. Various sensor positions such as the rear view or side view camera in combination with laser and other sensors such as inertial measurement unit (IMU), radar, sonar, and so on can be used in accordance with the desired implementation for the autonomous driving application.

FIG. 2 illustrates an example flow in accordance with an example implementation.

The camera and laser detect features of the well-structured objects from the environment. At 200, sensor points are obtained. Let $S_k$ be an array of 2D vectors $(x_k, y_k)$ from all the sensors features acquired by the ECU at time $t_k$. The camera feature points are stored in an array of n elements $S_{C,k}$ at time $t_k$ which is an array of 2D vector with coordinates $x_{C,k,n}, y_{C,k,n}$. The laser feature points are stored in an array of m elements $S_{L,k}$ at time $t_k$ which is an array of 2D vector of coordinates $x_{L,k,m}, y_{C,k,m}$. The algorithm checks if $S_{C,k}$ and $S_{L,k}$ arrays are empty at 201. If both arrays are empty, then the algorithm proceeds to 200 and waits to receive the data from sensor. When both the arrays $S_{C,k}$ and $S_{L,k}$ are populated (both not empty), the sensor array $S_k$, is updated with $S_{C,k}$ and $S_{L,k}$ at 202, wherein the sensor data is sent for time k and vehicle position to the historical data server at 203, and weights are initialized for the sensor points at 204.

Figure 3:
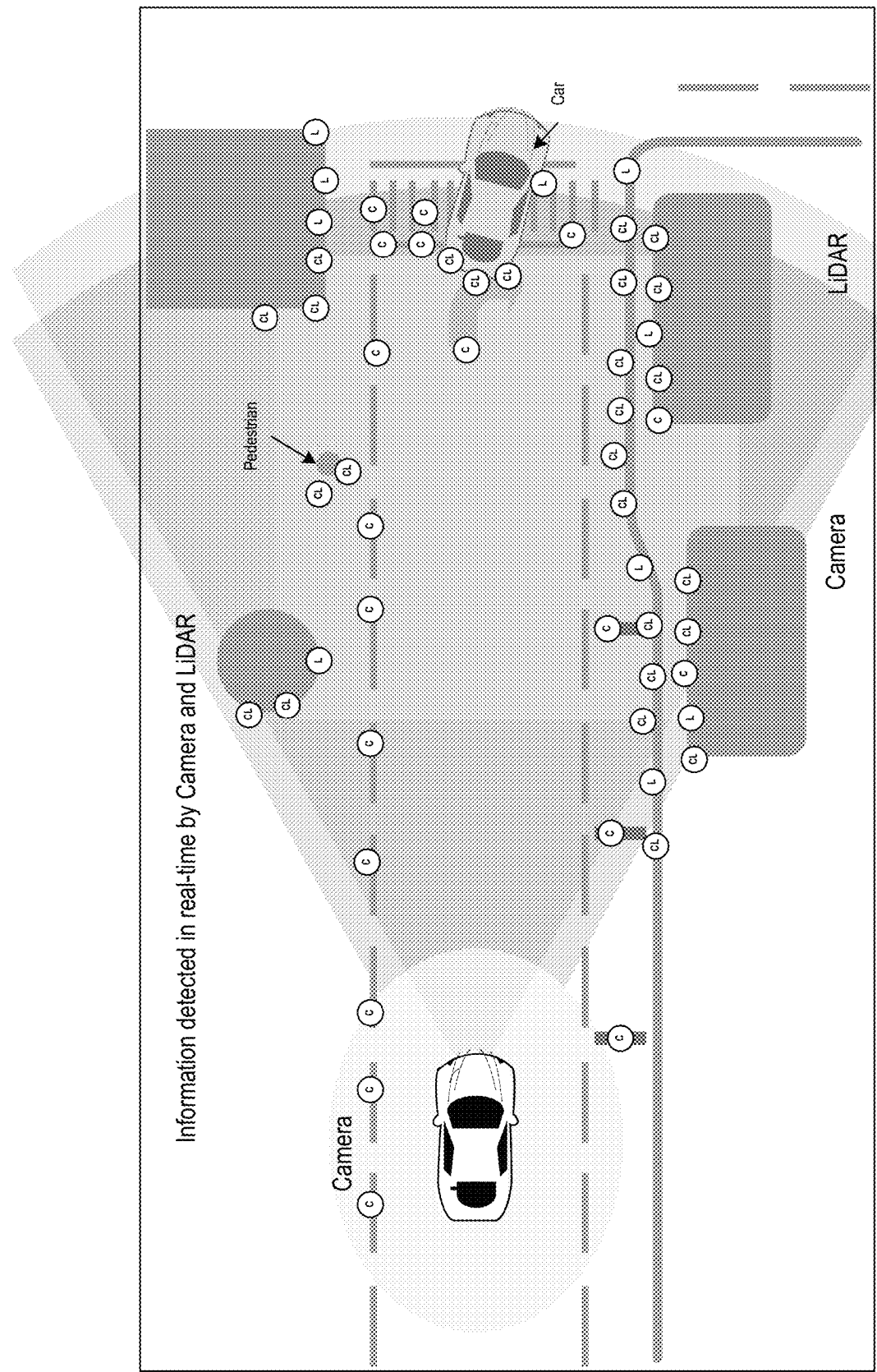
FIG. 3 illustrates an example of features detected by camera and laser, in accordance with an example implementation.

FIG. 3 illustrates an example of features detected by camera and laser, in accordance with an example implementation. The features detected by camera are denoted by C and corresponds to the features in array $S_{C,k}$. Whereas the features detected by laser are denoted by L and corresponds to the features in array $S_{L,k}$. The features denoted by CL are detected by camera and laser both; and corresponds to the features in both arrays $S_{C,k}$ and $S_{L,k}$.

To avoid duplication of features in the sensor array $S_k$ the algorithm appends the camera features first and then appends the laser features to the array but skips the features which are already present in $S_{C,k}$ array of camera.

$$S_k\{x_k,y_k\}_{n+m-q} = \text{append}\begin{cases} S_{C,k}\{x_{C,k,n},y_{C,k,n}\} & \text{... if features only by camera } (C) \\ S_{L,k}\{x_{L,k,m}, y_{L,k,m}\} & \text{... if features only from laser } (L) \\ S_{C,k}\{x_{C,k,n}, y_{C,k,n}\} | S_{L,k}\{x_{L,k,m}, y_{L,k,m}\} & \text{... if duplicate features } (CL) \end{cases}$$

The length of $S_k$ is dynamically allocated and can be calculated as n+m−q. Here n in number of features in array $S_{C,k}$ and m is number of features in array $S_{L,k}$. The length of features denoted by CL is q. The array $S_k$ is sent to the historical database as well to update the database.

Historical information database is created by the method described henceforth. Let $H_{db}$ is an array of 2D spatial vector say x,y defined in global reference frame. Suppose the vehicle is driving on a route for the first time and both sensors are effectively working, then the historical database array $H_{db}$ is initialized with the elements from array $S_k$ as $H_{db}=M_{l\rightarrow g}*S_k$. Here $M_{l\rightarrow g}$ is a matrix which maps local coordinates to global latitude longitude. This database can be stored on the edge or on the cloud server. If the historical database $H_{db}$ for the route is available, then the database is updated using the elements from sensor array $S_k$. The historical database filters the data and for every new data element received from sensor, if the element already exists in the database then the element confidence is updated. If new data is received, the element is stored in the database with a nominal confidence value. The update step can be represented by following equations.

First, example implementations transform temporal array $S_k$ to global spatial array $S_{spatial}=M_{l\rightarrow g}*S_k$. Then, example implementations update each element in $H_{db}$ with the spatial elemental array $$\{\zeta, x_{H_{db},i}, y_{H_{db},i}\} = f\{x_{S_k,spatial,i}, y_{S_k,spatial,i} | x_{H_{db},i}, y_{H_{db},i}\}$$

where $0<\zeta<1$ is confidence of the $i^{th}$ element and $(x_{H_{db}}, y_{H_{db}})$ is the coordinate of the $i^{th}$ element in global frame of reference. If $(x_{H_{db}}, y_{H_{db}})$ is given then only confidence is updated else confidence is set to nominal level and $(x_{S_{spatial},i}, y_{S_{spatial},i})$ is appended to the array $H_{db}$.

Figure 4A:
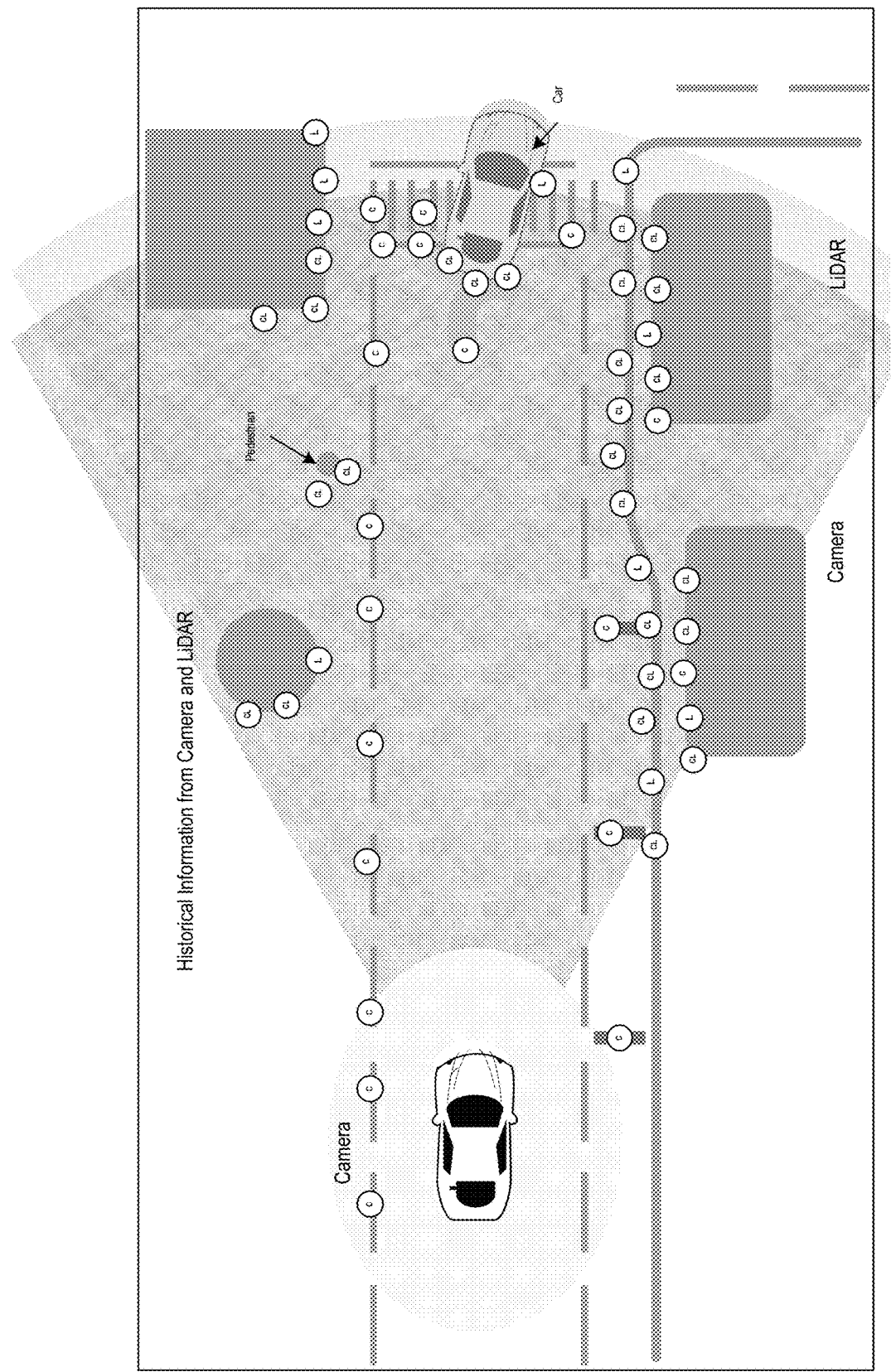
FIG. 4(a) illustrates an example of historical information from the camera and laser, in accordance with an example implementation.
Figure 4B:
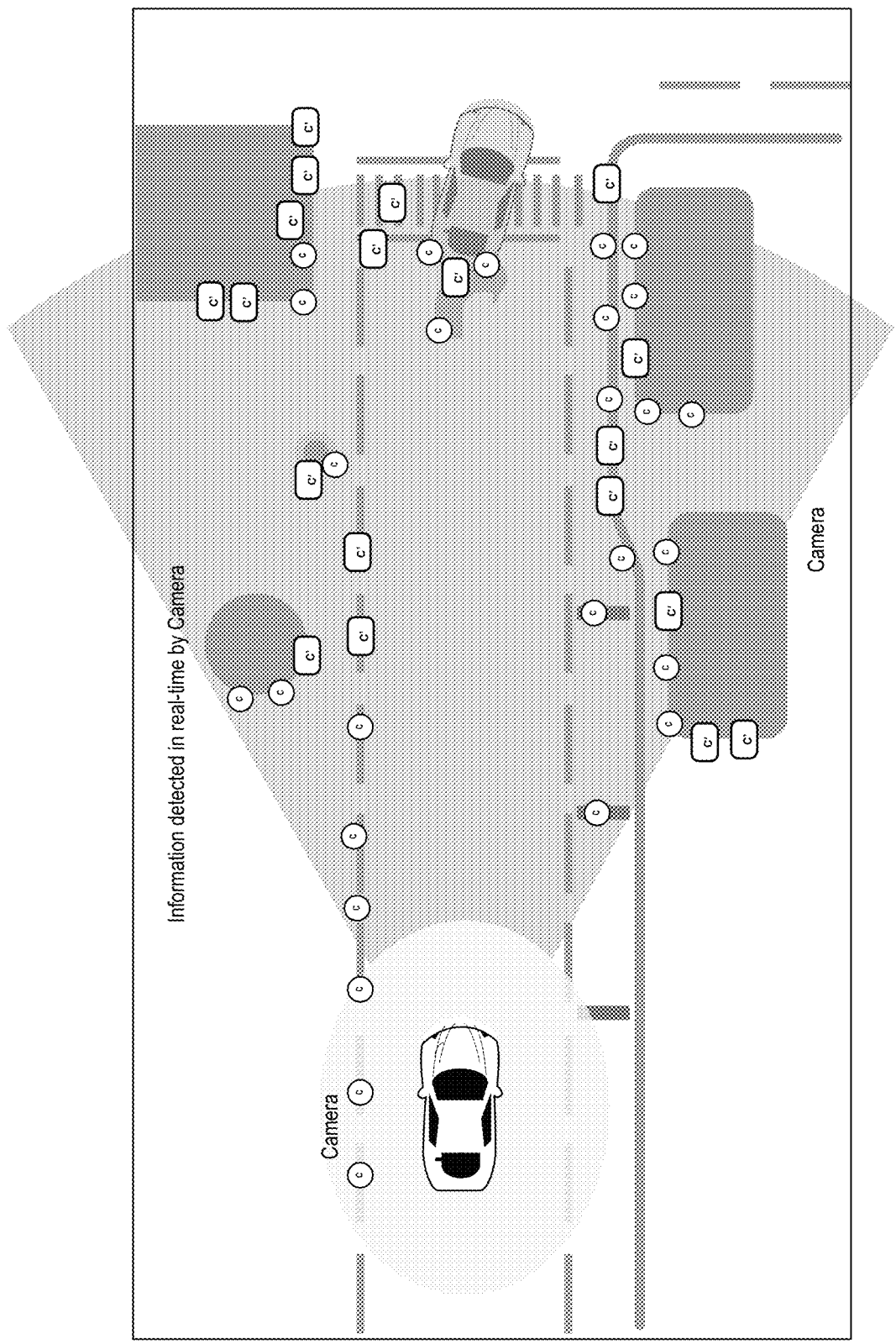
FIG. 4(b) illustrates an example of real time information as detected by camera only due to laser failure, in accordance with an example implementation.

If one of the sensor fails and cannot provide any information to the algorithm (one not empty) the point cloud density drastically reduces, thus affecting the further estimation. In an example described below with respect to laser failure, the sensor element array $S_{L,k}$ is empty for time step $t_k$. In such a situation, the flow proceeds to 205 to repopulate the sensor array with predicted elements. The prediction is carried out based on historical information at 206 wherein the predicted sensor points are then appended to the sensor array at 207, whereupon weights are applied to the sensor points at 208. The spatial historical information can be obtained from edge database or cloud server by sending a query of regarding a prior location estimate as shown at 209 and 210. FIG. 4(a) illustrates an example of historical information from the camera and laser, in accordance with an example implementation. FIG. 4(b) illustrates an example of real time information as detected by camera only due to laser failure, in accordance with an example implementation.

Let $h_{db}$ be a subset of $H_{db}$ which represents the elements within a predefined radius around the vehicle location. As shown in FIGS. 4(a) and 4(b), consider an object located in the right north corner.

Once the global historical information $h_{db}$ is obtained from the database, the flow proceeds to 211 wherein all the elements are first translated to relative local coordinates with respect to vehicle $h_{db,k}=M_{g\rightarrow l}*h_{db}$. Let $h_{db,k}$ be array small subset of feature points in local coordinate with respect to vehicle from the historical database representing a single object in space. The mean of feature points can be calculated as $$h_{db,k,mean} = \frac{\zeta * h_{db,k,i}}{r}$$

where r is the number of elements in $h_{db,k}$. Let $\vartheta \sim N(0, Q_s)$ be the measurement error of camera sensor defined with gaussian distribution of 0 mean and $Q_s$ the error covariance. The camera measurement is considered in the prediction step to generate homogeneity between measurement data and predicted data.

$$Q_s = \begin{pmatrix} \sigma_x^2 & 0 \\ 0 & \sigma_y^2 \end{pmatrix}$$

is error covariance matrix with $\sigma_x, \sigma_y$ error covariance in x, y direction respectively. The additional point predicted as follows. First, example implementations augment the $h_{db,k,mean}$ array with measurement error $\vartheta$ such that $$h_{a,db,k,mean} = \begin{bmatrix} h_{db,k,mean} \\ \vartheta \end{bmatrix}$$

Then example implementations define the prediction covariance matrix $$P_{(a,k|k)} = \begin{bmatrix} P_{(k|k)} & 0 \\ 0 & Q_s \end{bmatrix}$$

and where $P_{(k|k)}$ is simple Identity matrix of 2×2. The algorithm generates arbitrary sigma points for prediction as shown in FIG. 5.

The arbitrary points can be defined as follows $$x_{a,k|k}=[h_{db_c,mean,k|k} \quad h_{db_c,mean,k|k}+\sqrt{(\lambda+n_{h_{db}})P_{a,k|k}} \quad h_{db_c,mean,k|k}-\sqrt{(\lambda+n_{h_{db}})P_{a,k|k}}]$$

Then the predicted points can be obtained by following equation $$\hat{s}_{c'} = f(X_{a,k|k}, \vartheta)$$

Figure 5:
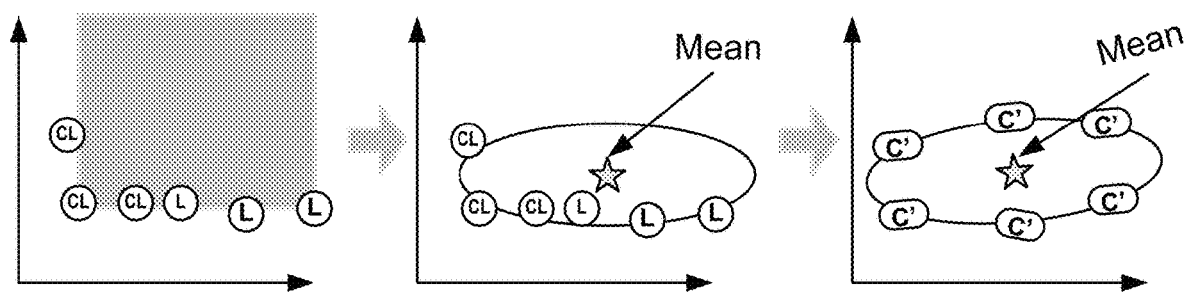
FIG. 5 illustrates an example prediction of data points based on historical information, in accordance with an example implementation.
Figure 6:
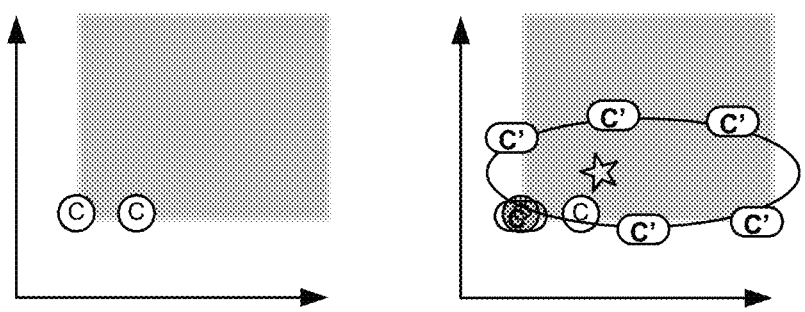
FIG. 6 illustrates an example of camera detection and prediction array, in accordance with an example implementation.

The elements in vector $\hat{s}_{c'}$ are denoted by C' as shown in FIG. 5. The process appends $\hat{s}_{c'}$ elements to the current $S_{C,k}$ array of 2D elements to populate the missing points. Suppose the camera sensor detected only two points on the object at time $t_k$, and predicted array $\hat{s}_{c'}$ has six more elements. Then, while appending the predicted elements, only those elements are appended which do not overlap the current detection. As shown in FIG. 6 the C' element which overlap the element C is not appended to the sensor array $S_{C,k}$.

Figure 7:
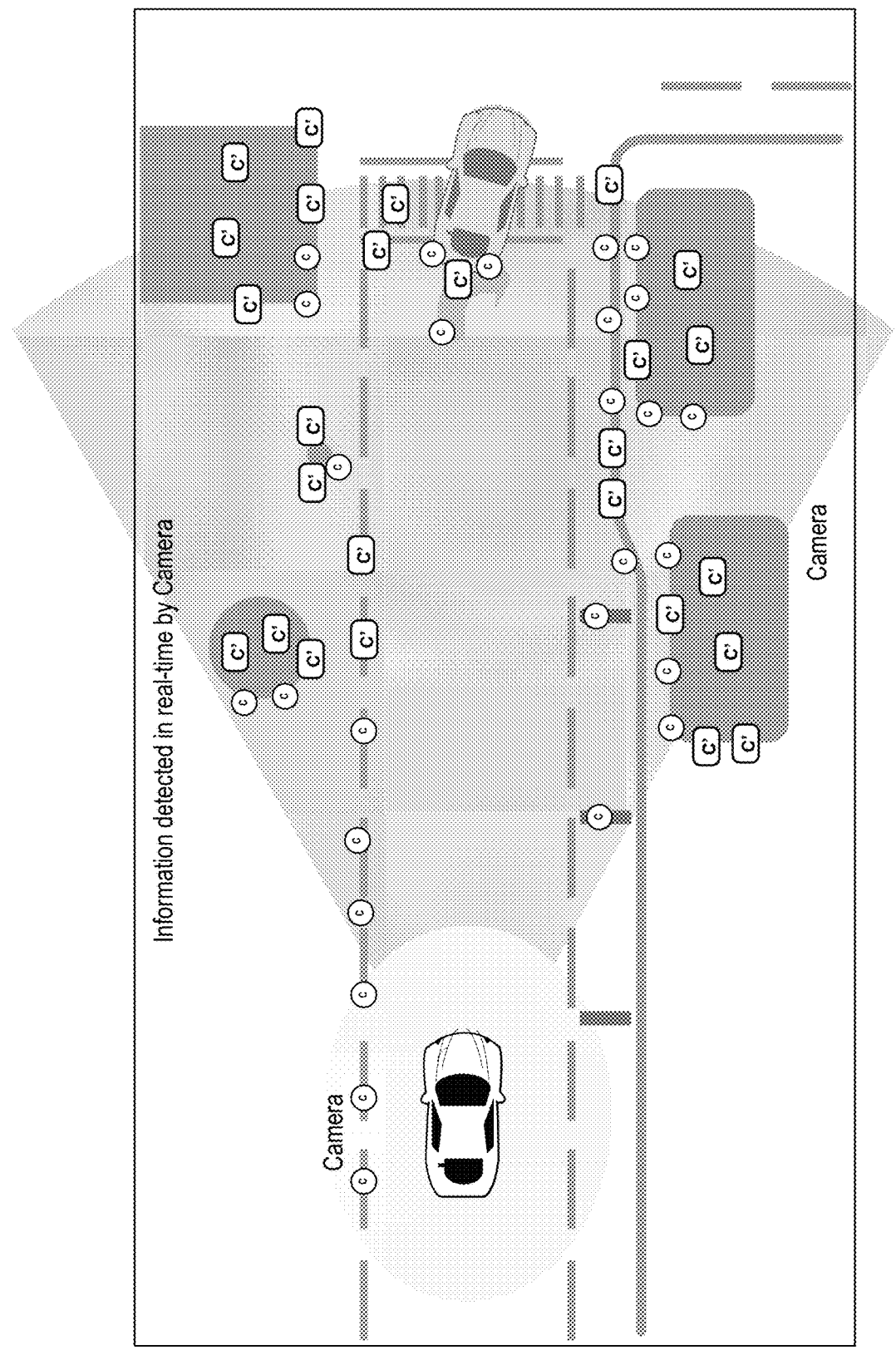
FIG. 7 illustrates an example of detection and prediction elements at time $t_k$, in accordance with an example implementation.

The algorithm does this for all set of points in the $h_{db}$, until the corresponding local map for time step $t_k$ is created as shown in FIG. 7.

Once sensor element array $S_k$ or just one of the $S_{C,k}/S_{L,k}$ is obtained, then the algorithm creates a local grid map by mapping each element to the grid index at 212.

Figure 8:
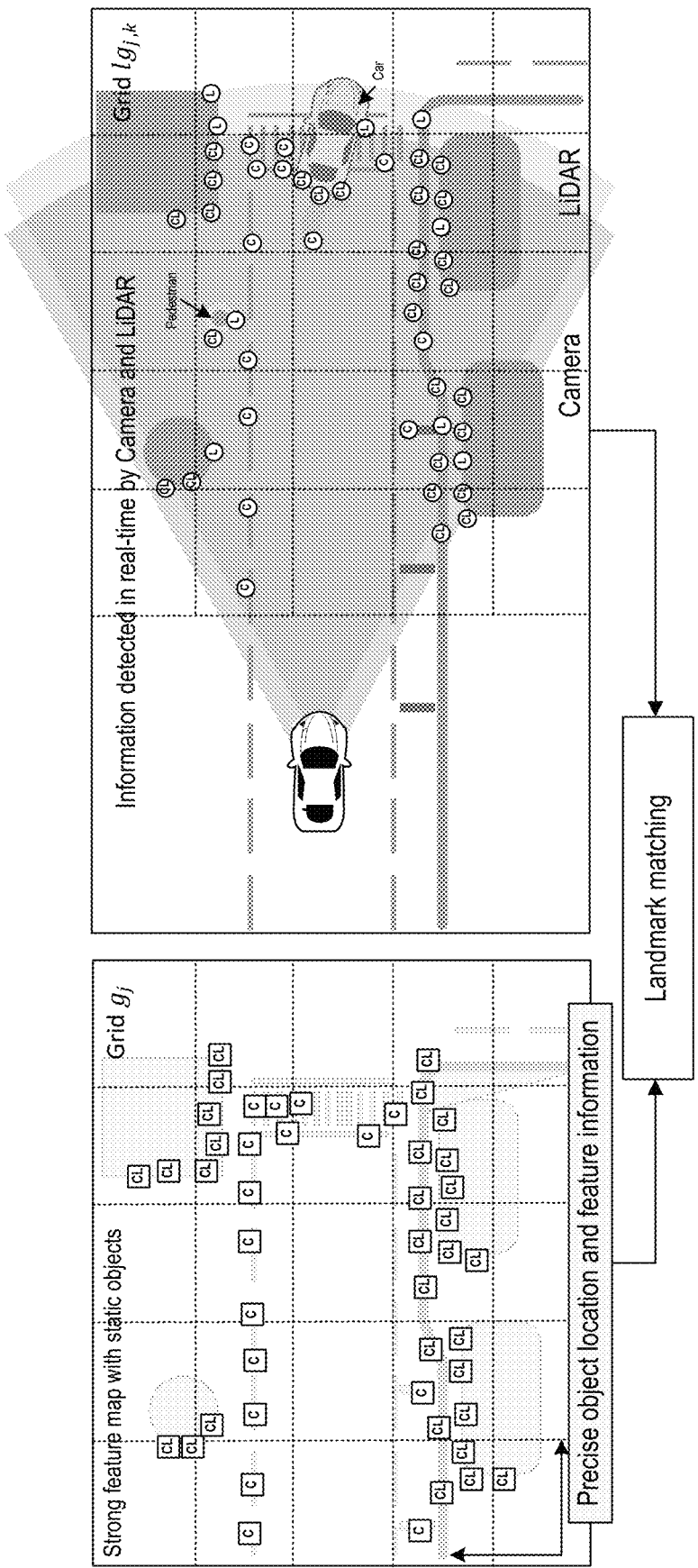
FIG. 8 illustrates an example of landmark matching using a grid map technique, in accordance with an example implementation.

The grid map is computed as $$l_{j,k} = ceil\frac{x_C - x_{min}}{r}, \frac{y_c - y_{min}}{r}$$

where j is a two element scalar representing x and y index for the element and r is the grid resolution (design parameter). At 213, the algorithm goes through each grid cell and using a set of elements from the grid and calculate the global positions of each element in global spatial reference frame, $lg_j = M_{l \rightarrow g} l_{j,k}$. Then the array $g_j$ of feature points from high definition map corresponding to the same grid j are used in conjunction with $lg_j$ for iterative closets point (ICP) matching as shown in FIG. 8. The ICP matching algorithm is used to match the points from the HD map to the current sensor data at 214.

The ICP algorithm estimates initial rotation and translation matrix from current vehicle odometry and prior location estimate at 215. Then the error is calculated at 216 for each element from $lg_j$ with each element from $g_j$ and iteratively the rotation and translation are estimated by minimizing the error as shown in the loop of 217. The error is defined by the equation below.

$$E(R, t) = \frac{1}{N_P}\sum_{i=0}^{N_P}\|lg_{j,i} - Rg_{j,i} - t\|^2$$

Where E is error, $N_p$ is number of feature points in $lg_j$. Here, R is rotation matrix and t is translation vector. At 218, the algorithm then stores only the matched landmark points in the array $LM_k$. Temporal objects such as vehicles or pedestrian tend to generate the error in location estimation due to their own motion. The landmark matching has an inherent advantage. The HD map generated by multiple drives, creates a map without any temporal objects. So, when ICP matching is used none of the features from temporal objects match with the HD map features. Thus, temporal objects are not passed to the position estimation localizer part improving estimation accuracy.

In the first case when both sensors are working correctly, the algorithm initializes the weights of each of the element in array $LM_k$ as follows. If the $i^{th}$ feature detected by both sensors; denoted by CL, is matched to HD map feature denoted by CL then the weight of $i^{th}$ element of $LM_k$ is set to $\omega_{cl,k,i}$. If the same $i^{th}$ feature is matched to HD map feature denoted by C or L i.e. camera or laser then the weight of $i^{th}$ element of $LM_k$ is set to $\omega_{c,k,i}$ or $\omega_{l,k,i}$ respectively. The following identity $\omega_{cl,k,i} > \omega_{c,k,i} = \omega_{l,k,i}$ is the minimum required condition for defining the weights of each element in $LM_k$. The weights table can be summarized in FIG. 11(a).

Figure 9:
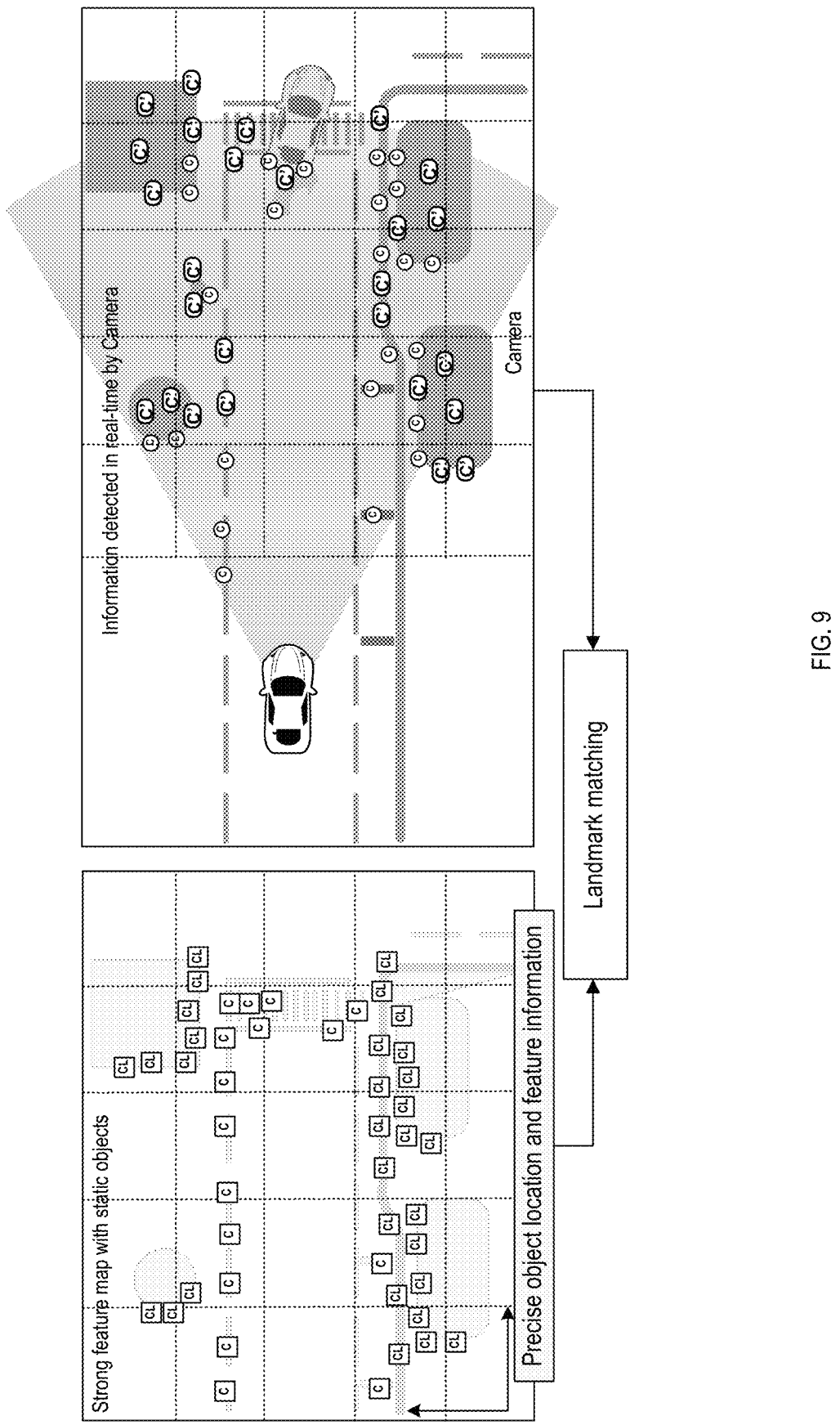
FIG. 9 illustrates an example of landmark matching using a grid map technique for the sensor failure case, in accordance with an example implementation.

In case of the sensor failure, the predicted and detected sensor elements are matched to the features from the HD map. While predicting features some of features are predicted in occluded areas where sensor may never detect the features. But in case of ICP matching as the HD map does not have features in these occluded areas, the features can easily be eliminated. For example, the object on top left corner has some predicted features in the occluded region as shown in FIG. 9. But in the map these features do not exists and hence no match will be found for these features. If the match for the features is not found the feature is not included in the Landmark array $LM_k$.

In the case of sensor failure, the algorithm initializes the weights for each element in the array as follows. If the feature detected by camera sensor denoted by C or predicted data denoted by C' is matched with feature denoted by C in HD map, the $i^{th}$ element in $LM_k$ is the weighted as $\omega_{c \rightarrow c,i}$. If the same feature matched with feature denoted by CL in HD map, then $i^{th}$ element in $LM_k$ is the weighted as $\omega_{c \rightarrow cl,i}$. Finally, if the same feature matched with feature denoted by L in HD map, then $i^{th}$ element in $LM_k$ is the weighted as $\omega_{c \rightarrow l,i}$. The following identity $\omega_{c \rightarrow cl,i} > \omega_{c \rightarrow c,i} > \omega_{c \rightarrow l,i}$ is the minimum required condition for defining the weights of each element in $LM_k$. The weights assigned to each element can be summarized as shown in FIG. 11(b).

Once the landmark matched array $LM_k$ and weights array $\omega_k$ is created, then the arrays are sent to the localizer for position estimation at 219.

The localizer uses vehicle control information and prior state information to predict the position of the vehicle for the current time step at 220. Then it uses the matched landmark sensor data present in array $LM_k$ to update or correct the predicted location. This is carried out at each time step. The localizer is explained in detail below.

Figure 10:
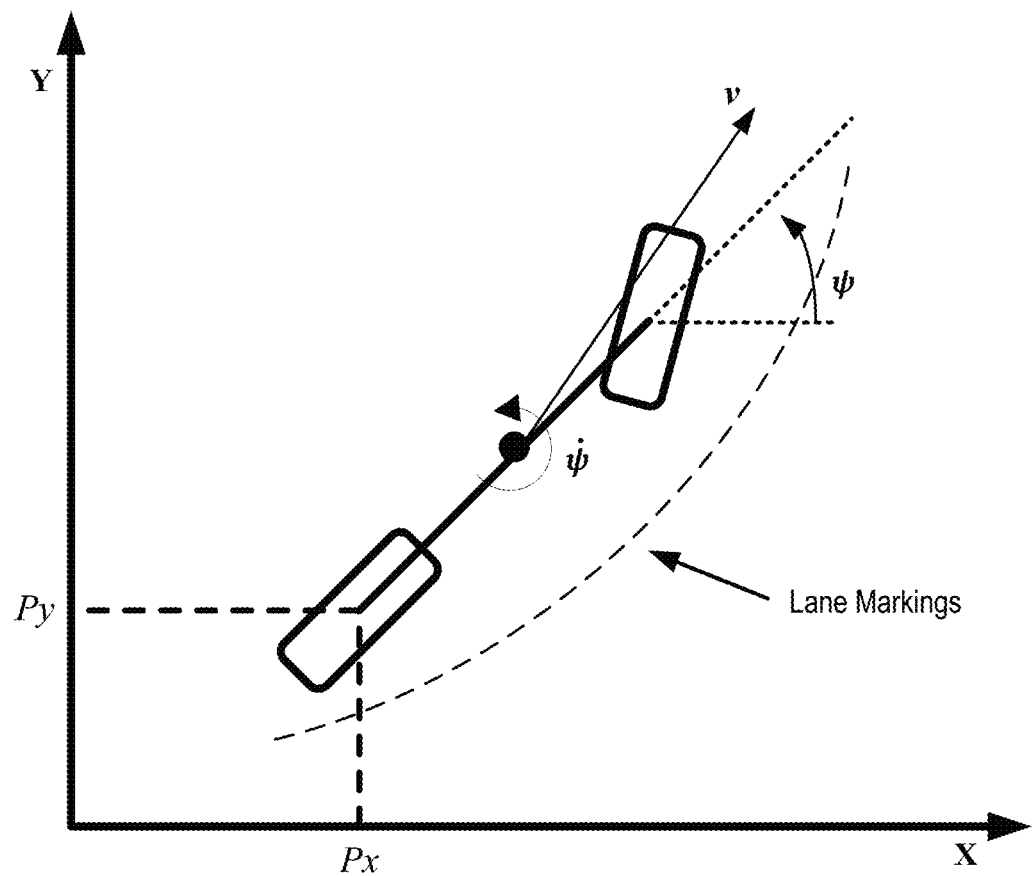
FIG. 10 illustrates an example of vehicle state, in accordance with an example implementation.

Suppose X is a state vector of vehicle describing the vehicle position with $p_x, p_y, v, \psi, \dot{\psi}$ with respect to global map as shown in FIG. 10. The state transition function for prediction is given by X'=FX+BU+noise where U is control input consists of acceleration/deceleration input and steering input to the vehicle, B is motion control matrix which maps the acceleration/deceleration and steering data to $p_x, p_y, v, \psi, \dot{\psi}$ and X is previous state consisting of this variables. F is state transition matrix which maps previous step states to the current step states. Also, the predicted state covariance matrix is obtained using $P' = FPF^T + Q$. Where P is state covariance matrix as and Q is prediction covariance error matrix which represents the process noise, shown in above equation. Once prediction of state X' is obtained the sensor measurements and weights are used to update the position of the vehicle using a method as described below.

The landmark features array and the weights are used to update the position. First the measurement function H is used to map the state predicted vector to measurements by using the equation z=HX' where z is measurements array obtained from the state precited vector X'. Then at 221, the measurement error is estimated using following formula.

$$\hat{y} = \omega_k * LM_k - z = \omega_{i,j} * LM_k - HX'$$

Here, $\omega_k$ is the array of weights of landmark points and $LM_k$ is the array of landmark points which matched in the process explained in above section of ICP matching. Then the innovation matrix S is estimated using $S = HP'H^T + R$ where R is the measurement noise from the sensor and H is measurement function. P' is predicted covariance matrix. At 222, the Kalman gain is then estimated using $K = P'H^T S^{-1}$.

Finally at 223, the state vector for current step is updated using $X=X'+K\hat{y}$ and state covariance matrix is updated using $P=(I-KH)P'$. Here, I is identity matrix. The current position information is fed back to the loop as shown in FIG. 2. It is also used to estimate vehicle control for next step as well as various other applications, depending on the desired implementation.

Error $\hat{y}$ depends on the weights and landmark features. Thus, weights play a major role in estimation of the state vector i.e. current vehicle position. If the feature has high weight, then the point has high influence in estimation of the vehicle location. As explained above, the stronger match points have higher weights. Hence, landmarks with strong features which are easily distinguishable in a global reference frame will improve the estimation as they will have high weights.

Example implementations described herein are implemented in an autonomous driving system. The algorithm is necessary for navigation of autonomous driving system from point A to B. Further, example implementations aid in estimating the control inputs of autonomous driving vehicle, as well as being utilized for creating high definition maps for vehicle. The sensor data acquired is in the vehicle coordinate system which can be used to transform in global spatial coordinates which can be stored as map information. The localization is also used to associate real-time traffic or other object data to the global reference frame which can be used in other prediction algorithm. Additionally, the associated data of real-time traffic or other environmental information can be for service business to other OEM or smart cities.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for an autonomous vehicle having a plurality of sensors, the method comprising:
    for a failure occurring in at least one of the plurality of sensors:
        obtaining first sensor data points from working ones of the plurality of sensors;
        obtaining second sensor data points from a historical database;
        conducting a prediction of missing sensor data points based on an error correction process applied in comparing the first sensor data points and the second sensor data points;
        weighing the missing sensor data points and the first sensor data points; and
        applying the weighted missing sensor points and the first sensor data points to localization for autonomous vehicle functions of the autonomous vehicle.

2. The method of claim 1, further comprising:
for a non-failure of the plurality of sensors:
transmitting sensor data points of the plurality of sensors for an associated timestamp to the historical database;
weighing the sensor data points; and
applying the weighted sensor points to the localization for the autonomous vehicle functions of the autonomous vehicle.

3. The method of claim 1, wherein the historical database is managed in an apparatus external to the autonomous vehicle, the historical database comprises historical data of camera sensor data points and LIDAR sensor data points for a plurality of locations recorded from sensor data of a plurality of autonomous vehicles.

4. The method of claim 1, wherein the conducting the prediction of the missing sensor data points comprises:
translating the received second sensor data points from the historical database according to local coordinates with respect to an orientation and location of the autonomous vehicle;
generating predictions of the missing data sensor points based on landmark objects associated with the translated second sensor data points within an error covariance; and
providing the predictions of the missing sensor data points having a lowest error covariance as the missing sensor data points.

5. The method of claim 1, wherein the weighing of the missing sensor data points and the first sensor data points are based on a map matching process.

6. The method of claim 5, wherein the map matching process comprises:
matching the missing sensor data points and the first data sensor points to associated points corresponding to landmarks in the historical database;
for matched points corresponding to camera and LIDAR ones of the points corresponding to the landmarks in the historical database, assign a first weight;
for matched points corresponding to only camera ones of the points corresponding to the landmarks in the historical database, assign a second weight that is less than the first weight;
for matched points corresponding to only LIDAR ones of the points corresponding to the landmarks in the historical database, assign a third weight that is less than the second weight.

7. A non-transitory computer readable medium, storing instructions for an autonomous vehicle having a plurality of sensors, the instructions comprising:
for a failure occurring in at least one of the plurality of sensors:
obtaining first sensor data points from working ones of the plurality of sensors;
obtaining second sensor data points from a historical database;
conducting a prediction of missing sensor data points based on an error correction process applied in comparing the first sensor data points and the second sensor data points;
weighing the missing sensor data points and the first sensor data points; and
applying the weighted missing sensor points and the first sensor data points to localization for autonomous vehicle functions of the autonomous vehicle.

8. The non-transitory computer readable medium of claim 7, the instructions further comprising:
for a non-failure of the plurality of sensors:
transmitting sensor data points of the plurality of sensors for an associated timestamp to the historical database;
weighing the sensor data points; and
applying the weighted sensor points to the localization for the autonomous vehicle functions of the autonomous vehicle.

9. The non-transitory computer readable medium of claim 7, wherein the historical database is managed in an apparatus external to the autonomous vehicle, the historical database comprises historical data of camera sensor data points and LIDAR sensor data points for a plurality of locations recorded from sensor data of a plurality of autonomous vehicles.

10. The non-transitory computer readable medium of claim 7, wherein the conducting the prediction of the missing sensor data points comprises:
translating the received second sensor data points from the historical database according to local coordinates with respect to an orientation and location of the autonomous vehicle;
generating predictions of the missing data sensor points based on landmark objects associated with the translated second sensor data points within an error covariance; and
providing the predictions of the missing sensor data points having a lowest error covariance as the missing sensor data points.

11. The non-transitory computer readable medium of claim 7, wherein the weighing of the missing sensor data points and the first sensor data points are based on a map matching process.

12. The non-transitory computer readable medium of claim 11, wherein the map matching process comprises:
matching the missing sensor data points and the first data sensor points to associated points corresponding to landmarks in the historical database;
for matched points corresponding to camera and LIDAR ones of the points corresponding to the landmarks in the historical database, assign a first weight;
for matched points corresponding to only camera ones of the points corresponding to the landmarks in the historical database, assign a second weight that is less than the first weight;
for matched points corresponding to only LIDAR ones of the points corresponding to the landmarks in the historical database, assign a third weight that is less than the second weight.

13. An apparatus configured to manage an autonomous vehicle having a plurality of sensors, the apparatus comprising:
a processor, configured to:
for a failure occurring in at least one of the plurality of sensors:
obtain first sensor data points from working ones of the plurality of sensors;
obtain second sensor data points from a historical database;
conduct a prediction of missing sensor data points based on an error correction process applied in comparing the first sensor data points and the second sensor data points;
weigh the missing sensor data points and the first sensor data points; and apply the weighted missing sensor points and the first sensor data points to localization for autonomous vehicle functions of the autonomous vehicle.

14. The apparatus of claim 13, wherein for a non-failure of the plurality of sensors, the processor is configured to:

transmit sensor data points of the plurality of sensors for an associated timestamp to the historical database;

weigh the sensor data points; and apply the weighted sensor points to the localization for the autonomous vehicle functions of the autonomous vehicle.

15. The apparatus of claim 13, wherein the historical database is managed in another apparatus external to the autonomous vehicle, the historical database comprises historical data of camera sensor data points and LIDAR sensor data points for a plurality of locations recorded from sensor data of a plurality of autonomous vehicles.

16. The apparatus of claim 13, wherein the processor is configured to conduct the prediction of the missing sensor data points by:

translating the received second sensor data points from the historical database according to local coordinates with respect to an orientation and location of the autonomous vehicle;

generating predictions of the missing data sensor points based on landmark objects associated with the translated second sensor data points within an error covariance; and providing the predictions of the missing sensor data points having a lowest error covariance as the missing sensor data points.

17. The apparatus of claim 13, wherein the weighing of the missing sensor data points and the first sensor data points are based on a map matching process.

18. The apparatus of claim 17, wherein the processor is configured to execute the map matching process by:

matching the missing sensor data points and the first data sensor points to associated points corresponding to landmarks in the historical database;

for matched points corresponding to camera and LIDAR ones of the points corresponding to the landmarks in the historical database, assign a first weight;

for matched points corresponding to only camera ones of the points corresponding to the landmarks in the historical database, assign a second weight that is less than the first weight;

for matched points corresponding to only LIDAR ones of the points corresponding to the landmarks in the historical database, assign a third weight that is less than the second weight.

* * * * *